Oct. 28, 1952  W. M. BRUBAKER  2,616,045
ELECTRICAL CONVERTER
Filed June 2, 1947
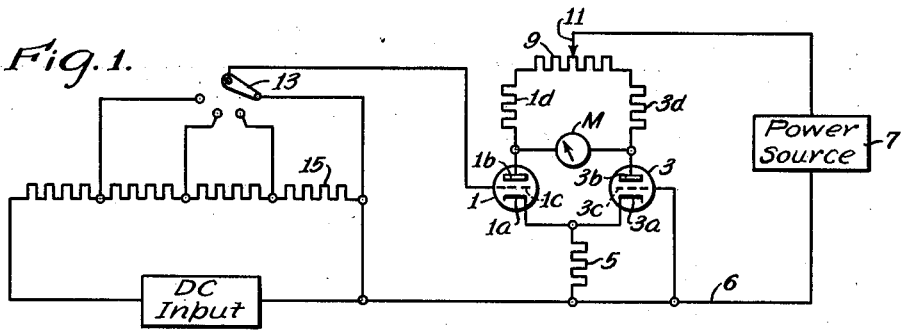
Fig. 1.
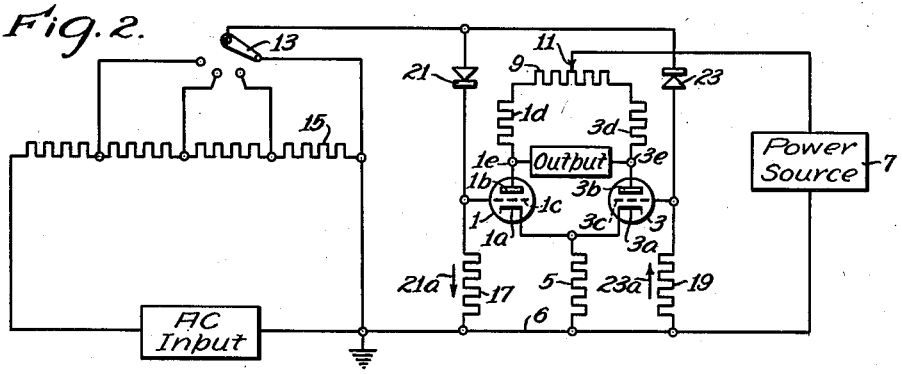
Fig. 2.
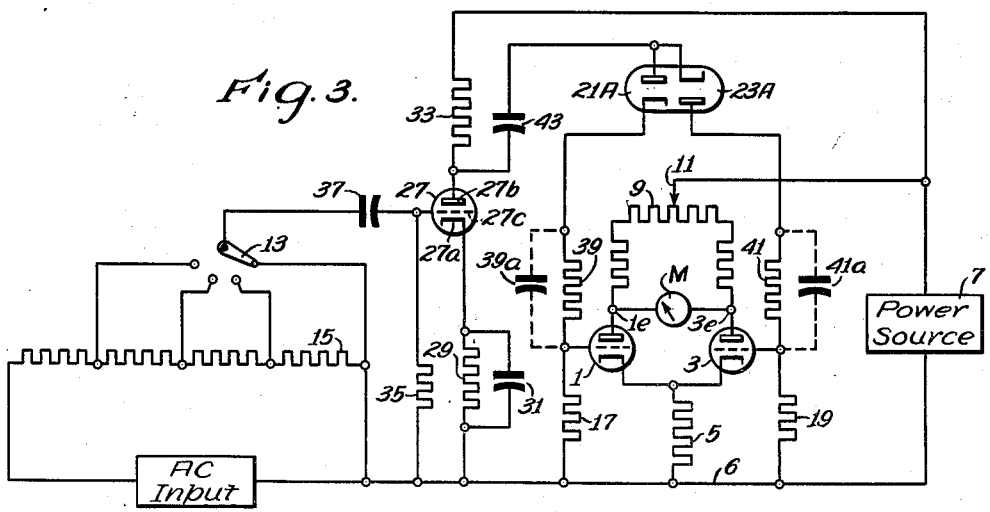
Fig. 3.
Fig. 4.
WITNESSES:
Robert C. Baird
Nuble Groove
INVENTOR
Wilson M. Brubaker.
BY C. L. Freedman
ATTORNEY Patented Oct. 28, 1952

2,616,045

UNITED STATES PATENT OFFICE 2,616,045

ELECTRICAL CONVERTER

Wilson M. Brubaker, Pittsburgh, Pa., assignor to Westinghouse Electric Corporation, East Pittsburgh, Pa., a corporation of Pennsylvania Application June 2, 1947, Serial No. 751,876

8 Claims. (Cl. 250—27)

This invention relates to devices having outputs representative of characteristics of variable quantities and it has particular relation to a device having an output proportional to the average values of a variable quantity.

In accordance with the invention, a system is provided for establishing two electrical currents. One of these currents is increased in magnitude in accordance with alternate half-cycles of an alternating wave. The remaining electrical current is decreased in magnitude in accordance with the inverse of the remaining half-cycles of the alternating wave.

In a preferred embodiment of the invention, two electrical tubes are provided having cathode and plate circuits which are connected in parallel across a power supply. A control electrode in each of the tubes is associated with a separate rectifier for energization in accordance with alternate half-cycles of an electrical wave. If positive half-cycles of the alternating wave are employed for applying a signal to the control electrode of one of the tubes, negative half-cycles are employed for applying a signal to the control electrode of the remaining tube. The control electrodes are energized by the half-cycles with opposite polarities relative to a common terminal or ground which is connected to the cathodes of the tubes. Desirably, the alternating wave is amplified prior to its application to the aforesaid rectifiers.

A system embodying the invention has a high input impedance which is substantially uniform over the entire range of operation thereof. Furthermore, the output of the system is substantially linear relative to the average value of the alternating wave input.

As applied to a symmetrical alternating quantity, the expression "average value" is intended to denote the half-period average value of the alternating quantity or the average value of the quantity resulting from full-wave rectification of the alternating quantity.

It is therefore an object of the invention to provide an improved system having an output representative of the average value of a variable quantity applied thereto.

It is a further object of the invention to provide an electrical converter for converting an alternating input into a direct current output wherein the system has a high and substantially uniform input impedance over the range of operation thereof.

It is an additional object of the invention to provide an electrical converter employing tubes wherein the cathodes of all tubes are connected to one of the input terminals of the system.

It is a still further object of the invention to provide a system for developing two electrical currents which are varied in magnitude in opposite directions respectively by successive halfcycles of an alternating wave for the purpose of producing an output which is representative of the average value of the alternating wave.

It is an additional object of the invention to provide an improved method for measuring the average value of an alternating wave.

Other objects of the invention will be apparent from the following description of the invention taken in conjunction with the accompanying drawing, in which:

Figure 1 is a schematic view of a prior art vacuum-tube voltmeter;

Fig. 2 is a schematic view of a system embodying the invention for providing an output representative of the average value of an alternating wave;

Fig. 3 is a schematic view showing a modification of the system of Fig. 2; and

Fig. 4 is a schematic view showing a modification of a portion of the systems of Figs. 2 and 3.

Referring to the drawing, Fig. 1 shows a conventional vacuum-tube voltmeter which includes two tube units or tubes 1 and 3. In the specific embodiment herein illustrated, the tubes comprise triodes, each having a cathode element, an anode element and a control electrode or grid. For example, the tube 1 has a cathode element $1a$, an anode element $1b$ and a control electrode $1c$. Similarly, the tube 3 has a cathode element $3a$, an anode element $3b$ and a control electrode $3c$. The cathode elements are connected through a common resistor 5 and a common terminal 6 to one terminal of a source of power 7. Generally, this source of power represents a direct current source. Resistors $1d$ and $3d$ are connected in series respectively with the anode elements $1b$ and $3b$. The free ends of the resistors $1d$ and $3d$ are connected to the terminals of a resistor 9. This resistor has an adjustable tap 11 which is connected to the remaining terminal of the source of power 7.

By an inspection of Fig. 1, it will be observed that the control electrode $3c$ is connected directly to the common terminal 6. The control electrode $1c$ is connected through a switch 13 to one of the taps of a voltage divider 15. A direct current input is connected across the terminals of the voltage divider 15. The magnitude of the input is indicated by a measuring instrument M, which may be of the permanent-magnet, moving-coil type.

Since the vacuum-tube voltmeter of Fig. 1 is well known in the prior art, a further discussion of its construction and operation is believed to be unnecessary. A similar bridge circuit for a vacuum-tube voltmeter is discussed in the Theory and Applications of Electron Tubes by H. J. Reich, page 602. The second edition of this book was published by the McGraw and Hill Book Company of New York city in 1944.

The vacuum-tube voltmeter illustrated in Fig. 1 is very satisfactory for measuring direct-current inputs. It has also been proposed that an alternating quantity be rectified for the purpose of charging a capacitor. The voltage across the capacitor then is measured by the vacuum-tube voltmeter of Fig. 1 for the purpose of indicating the peak value of the alternating quantity.

If the alternating quantity has the conventional sinusoidal configuration, the peak value of the quantity has a definite relation to the root-mean-square magnitude of the quantity, and the voltmeter may be calibrated to indicate directly the related root-mean-square magnitude. However, wave forms encountered in practice often do not have a sinusoidal configuration.

When the wave form of an alternating wave departs from a sinusoidal configuration, the peak value of the wave no longer represents the effective or root-mean-square magitude of the wave. As well understood in the art, root-mean-square values are commonly employed in the engineering field, and systems are desired which are responsive to such root-mean-square values. A system which is responsive to the average value of an alternating wave provides an output which bears a much closer relation to the root-mean-square magnitude of the wave. Such a system is illustrated in Fig. 2.

Referring to Fig. 2, it will be observed that the tubes 1 and 3, the power source 7 and the resistors 5, 1d, 3d and 9 are associated in substantially the same relationship discussed with reference to Fig. 5. However, in Fig. 2 the control electrodes 1c and 3c are connected to the common terminal 6 respectively through resistors 17 and 19.

The switch 13 and the voltage divider 15 of Fig. 1 again are employed in Fig. 2 for supplying a suitable input to the tubes 1 and 3. To this end the switch 13 is connected to the control electrodes 1c and 3c, respectively, through rectifiers 21 and 23. It will be noted that the rectifiers are oppositely poled. Consequently, if rectifier 21 is poled to pass positive half-cycles of an input alternating wave through the resistor 17, the rectifier 23 is poled to pass negative half-cycles of the same alternating wave through the resistor 19. The directions of flow of current through the rectifiers 21 and 23 are represented respectively by arrows 21a and 23a. Consequently, the current represented by the arrow 21a energizes the control electrode 1c positively with respect to the common terminal 6 whereas the current represented by the arrow 23a energizes the control electrode 3c negatively relative to the common terminal 6.

The output from the tubes 1 and 3 is derived from two terminals 1e and 3e, which are connected respectively to the anode elements 1b and 3b. Consequently, if an alternating input is connected across the voltage divider 15 of Fig. 2, the resulting signals on the control electrodes of the tubes tend to increase the current flowing through the tube 1 and to decrease the current flowing through the tube 3. For this reason, an output voltage obtained from the two terminals 1e and 3e is a pulsating direct voltage which represents the difference in magnitudes between the currents flowing through the resistors 1d and 3d.

Various types of rectifiers may be employed as the rectifiers 21 and 23. Barrier-layer rectifiers, such as copper-oxide or selenium rectifiers, may be employed at the lower frequencies, but the low resulting input impedances and capacitances of such rectifiers render them less suitable for rectifying high-frequency inputs.

Crystal rectifiers, such as those containing a major proportion of silicon or germanium, may be employed for the rectifiers 21 and 23. These have good high-frequency performance.

As a still further example of rectifiers, electronic rectifiers of the diode type may be employed. Such rectifiers are suitable for rectifying high-frequency inputs and result in a desirably high input impedance.

It is believed that the operation of the system of Fig. 2 will be apparent from the foregoing discussion. The tap 11 is adjusted to provide zero output from the tubes 1 and 3 when no input is applied across the voltage divider 15. When an input is applied across the voltage divider 15, the switch 13 is manipulated to the desired range. As previously pointed out, the input is rectified by the rectifiers 21 and 23 to energize the electrodes 1c and 3c with opposite polarities relative to the common terminal 6. It will be recalled that the common terminal 6 is connected to the cathode elements of the tubes through the common coupling resistor 5.

As a result of the aforesaid energizations of the control electrodes, current through the tube 1 increases during alternate half-cycles of the input wave whereas the current through the tube 3 decreases during the remaining half-cycles of the alternating wave. The output from the terminals 1e and 3e represents the difference between these currents or the average value of the alternating input wave, and may be used for any desired control operation or for application to a measuring instrument to indicate the average value.

In high-frequency work, the input to the voltage divider 15 often is derived from grounded electronic equipment, and it is desirable in many cases to ground one terminal of the voltage divider 15 as indicated in Fig. 2. In the system of Fig. 2 the cathode elements of the tubes 1 and 3 are connected to ground through the common resistor 5, and one terminal of each of the input resistors 17 and 19 also is connected to ground. Under such conditions, it is impossible for the input voltages to float with respect to ground, and stable operation is assured. Furthermore, such connections help to prevent the development of excessive potentials at points of the system relative to ground.

The diode rectifier has a desirably large back resistance and a reasonably small forward resistance. By connecting the diode rectifier in series with a stable fixed resistance which is large compared to the forward resistance of the diode rectifier, variations in the effective forward resistance of the rectifier do not affect substantially the overall resistance of the diode rectifier and the fixed resistance.

If the system is employed for measuring direct-current quantities as shown in Fig. 1, the scale of the measuring instrument is essentially linear. If the system is employed for measuring alternating quantities as shown in Fig. 2, the scale distribution of the measuring instrument is essentially linear execept for a small range of small input voltages. This is due largely to the small internal voltage of the diode rectifier resulting from the velocity of electrons emitted from the cathode element. A discussion of the effect of initial velocities of emitted electrons or effective anode voltage is presented in the aforesaid Reich book, pages 35 and 36.

Although separate scales may be provided for direct-current and alternating-current measurements, it is desirable to employ a common scale for both measurements. The effect of the internal voltage on scale distribution may be minimized by introducing an amplifier between the rectifiers and the voltage divider 15. Such an amplifier is illustrated in Fig. 3 and comprises a tube 27 having a cathode element 27a, an anode element 27b and a control electrode 27c. The cathode element 27a is connected to the common terminal 6 through a biasing resistor 29 having a capacitor 31 thereacross. The anode element 27b is connected through a resistor 33 to the positive terminal of the power source 7. A resistor 35 connects the control electrode 27c to the common terminal 6, and the switch 13 is connected to the control electrode 27c through a coupling capacitor 37.

Otherwise, Fig. 3 is similar in most respects to the system illustrated in Fig. 2. The rectifiers 21 and 23 of Fig. 2 are illustrated in Fig. 3 as comprising diode units 21A and 23A. It will be understood that when tubes or tube units such as diode or triode units are employed, they may be enclosed in separate envelopes, or several such units may be enclosed in a single envelope.

Resistors 39 and 41 are illustrated as included in the connections between the diode units and their respective control electrodes. If desired, capacitors 39a and 41a may be connected across resistors 39 and 41. The resistors 39 and 17 form in effect a voltage divider which supplies a suitable input to the tube 1. If the tube 1 introduces substantial capacitance across the resistor 17, the capacitor 39a may be selected to provide a ratio of capacitive reactances across the resistors 39 and 17 which is substantially equal to the ratio of the resistances of the resistors. Similar comments apply to the resistors 41 and 19 and the capacitor 41a. A coupling capacitor 43 connects the anode element 27b to the rectifiers 21a and 23a. Reasonably satisfactory performance has been obtained despite the omission of the capacitors 39a and 41a.

As previously pointed out, the diode rectifiers 21A and 23A as employed have characteristics providing a reasonably linear relationship between the applied voltage and the current flowing through the rectifiers except for small values of applied voltage. By amplifying the voltage across the voltage divider 15 before it is applied to the rectifiers, the range of nonlinearity on the meter end can be reduced to a negligible range. This is desirable for the reason that the provision of a linear scale on the measuring instrument M permits the measuring instrument to be employed with the same scale for both alternating current and direct current inputs.

The system of Fig. 3 has a substantially constant input impedance over its entire range of operation. The input impedance may be of the order of several megohms. In addition, the system provides adequate overload protection for the measuring instrument M. Such protection may be afforded by designing the amplifier, the rectifiers or the tubes 1 and 3 to saturate before the output has reached a value which would damage the measuring instrument M.

As representative of suitable components the tube 27 may be a 6J5 tube. The rectifiers may be provided by a 6H6 tube type, and 6K6 tubes (in triode connection) may be employed for the tubes 1 and 3. With the foregoing tubes, the following component values are suitable:

| | |
|---|---|
| Capacitor 37 | .01 microfarads |
| Capacitor 43 | .1 microfarads |
| Resistor 35 | $2 \times 10^6$ ohms |
| Resistor 33 | $5 \times 10^4$ ohms |
| Resistor 17 | $10^4$ ohms |
| Resistor 19 | $10^4$ ohms |
| Resistor 39 | $10^5$ ohms |
| Resistor 41 | $10^5$ ohms |

If the system of Fig. 3 is to be employed as a vacuum-tube voltmeter, the measuring instrument M may take the form of a permanent-magnet, moving-coil instrument connected between the terminals 1e and 3e.

If desired the internal voltages introduced by the diode rectifiers of Figs. 2 and 3 may be compensated by means of compensating voltages as shown in Fig. 4. In Fig. 4, the tubes 1 and 3, the resistors 17 and 19 and the common terminal 6 of Fig. 2 or Fig. 3 are shown. Voltage drops are produced across resistors D17 and D19 respectively by batteries B17 and B19. An adjustable portion of the voltage drop across the resistor D17 is connected in series with the resistor 17 with proper polarity to oppose the internal voltage of the associated rectifier and with proper magnitude for neutralizing the internal voltage. Similarly, a portion of the voltage drop across the resistor D19 is connected in series with the resistor 19 to compensate for the internal voltage of the rectifier associated with the tube 3.

Although the invention has been described with reference to certain specific embodiments thereof, numerous modifications are possible. The appended claims have been drafted to cover all modifications falling within the spirit and scope of the invention.

I claim as my invention:

1. In an electrical converter, first circuit means for establishing first and second current flows, input means, second circuit means for increasing the first current flow in accordance with alternate half cycles of an alternating quantity applied to the input means, third circuit means for decreasing the second current flow in accordance with the remaining half cycles of the alternating quantity, and output means for providing an output dependent on the difference between the magnitudes of the first and second current flows.

2. In an electrical converter, a first unidirectional device comprising a first cathode element, a first anode element, said device in operation when energized from a source of voltage being designed to pass a unidirectional current between the elements, and a first control electrode for controlling current flow between the elements, a second unidirectional device comprising a second cathode element, a second anode element, the second elements when energized from a source of voltage being designed to pass a unidirectional current therebetween, and a second control electrode for controlling current flow between the second elements, input means, first circuit means for energizing the first control electrode relative to the first elements to increase current flow between the first elements in accordance with alternate half cycles of an alternating quantity applied to the input means, second circuit means for energizing the second control electrode relative to the second elements to decrease current flow between the second elements in accordance with the values of remaining half cycles of the alternating quantity, and terminal means for providing an output differentially responsive to the current flows.

3. In an electrical system, a first electronic tube unit having first output elements effective when energized from a source of voltage for passing current therebetween and having a control member for controlling current passing between the output elements effective when energized from a source of voltage, a second electronic tube unit having second output elements for passing current therebetween, said second electronic tube unit including a second control member for controlling current passing between the second output elements, a pair of terminals, a first rectifier unit connected to energize the first control member relative to the first output elements in accordance with alternate cycles of an alternating quantity applied to the terminals, a second rectifier unit connected to energize the second control member relative to the second output elements in accordance with the remaining half cycles of the alternating quantity, said control members being energized to affect oppositely the current flows in the respective tube units, and translating means differentially responsive to the current flows.

4. A system as defined in claim 3 wherein said rectifier units comprise diodes, the system comprising an amplifier connected to apply the amplifier output to the terminals, said amplifier having a gain sufficient to provide a substantially linear relationship between the input to the translating means and an alternating input to the amplifier over a substantial part of the range of variation of the alternating input for which the system is designed.

5. In an electrical system, a plurality of electrical tube units each having a cathode element, an anode element and a control electrode for controlling current flow between the elements, a direct-current source having first and second terminals, a pair of resistors each having a terminal connected to the first terminal of the source, said resistors having their remaining terminals each connected to the second terminal of the source through the elements of a separate one of the tube units, translating means differentially responsive to the magnitudes of the voltages across said resistors, a pair of input terminals, first circuit means for energizing the control electrode of a first of said tube units relative to an associated one of said elements in accordance with alternate half cycles of an alternating quantity applied to the input terminals, and second circuit means for energizing the control electrodes of a second of said tube units relative to an associated one of the elements in accordance with the remaining half cycles of the alternating quantity applied to the input terminals, said energizations being poled to affect oppositely the magnitudes of current flows between the associated elements.

6. A system as defined in claim 5 wherein the cathode elements of each of said tube units are connected to the direct-current source and to the control electrodes through a common resistor.

7. In an electrical system responsive to the average value of an alternating quantity, a pair of electrical tube units each having an anode element, a cathode element and a control electrode, a common resistor connecting the cathode elements to a common terminal, means including connections for maintaining said anode elements at a positive potential relative to said common terminal, said connections including a separate resistor element for each of the tube units connected to carry the current flowing between the elements of the associated tube unit, translating means responsive to the difference in magnitudes of the voltages across said resistor elements, an input terminal, and a pair of circuit arms connected in parallel between the common terminal and the input terminal, each of said arms including a rectifier and a resistor, said rectifiers being poled to pass current in opposite directions between the input terminal and the common terminal, said control electrodes being connected respectively to said arms at points intermediate each rectifier and its associated resistor.

8. A system as defined in claim 7 wherein the rectifiers comprise diode units, said system including an amplifier for amplifying an alternating quantity, said amplifier having connections for applying its output between the input terminal and the common terminal, and the amplifier having a gain permitting a substantially linear relationship between the input to the translating means and the alternating quantity over a major portion of the range of variation of the alternating quantity for which the system is designed.

WILSON M. BRUBAKER.

REFERENCES CITED

The following references are of record in the file of this patent:

UNITED STATES PATENTS

| Number | Name | Date |
|---|---|---|
| 1,800,474 | Scherer | Apr. 14, 1931 |
| 2,203,485 | Bentley | June 4, 1940 |
| 2,353,107 | Winther | July 4, 1944 |
| 2,425,641 | Remde | Aug. 12, 1947 |
| 2,432,826 | Smith | Dec. 16, 1947 |